Patented Nov. 24, 1970

3,542,707
FILM-FORMERS COMPRISING STARCH, CATIONIC POLYMER AND ALIPHATIC DIALDEHYDE
Ralph L. Wilkinson, Downers Grove, Ill., assignor to CPC International Inc., a corporation of Delaware
No Drawing. Filed Mar. 20, 1968, Ser. No. 714,401
Int. Cl. C08g 37/22
U.S. Cl. 260—17.3
11 Claims

ABSTRACT OF THE DISCLOSURE

Covers improved film-formers comprising a starch based system which includes starch, a cationic polymer and a polyaldehyde. Also, covers their use in treating surfaces such as in coating cellulosic fibrous articles, including paper and textiles. Specifically, is involved with paper coating compositions and their use in increasing paper wet-rub resistance after coating a paper article therewith.

---

There has been an ever-continuing demand for a coating material which may be applied to a number of varying substrates, and that will impart to the treated article improved properties. For example, coatings are often applied to cellulose fibrous materials such as textiles and paper. In the area of textile treatment, film-formers are applied in order to increase water and oil resistance, crease-resistance, render the material soft to the touch, etc.

The art is particularly developed with respect to coating paper in order to improve its water resistance, wet and dry strengths, adsorptive capacity for printing, optical properties, etc. Specifically there has been an increased demand for coated paper and cardboard with a greater resistance to water, and more specifically to produce paper articles which have excellent wet-rub resistance. Paper articles resistant to water are necessary in offset printing, for containers and labels for frozen foods, and for many other applications in which there is a probability that the coating will come in contact with water or a moist atmosphere. Other types of paper, such as wallpaper, posters, cartons, etc. also fall within this category of requiring water resistance.

Generally, the most important components of a coating preparation for paper are usually a pigment, such as clay, and a binding agent, which serves to bind the pigment particles together and make them adhere to the paper surface. Different types of starch have already been used for a long time as binding agents in coating preparations for paper.

In the past, the difficulties often encountered with coatings in general have included cost, lack of ease of application to the paper, tendency to foam, undesirable odor, insufficient water resistance, and unusually high concentration of binder required to achieve desired result.

In view of the just-discussed demand for coated paper having good wet-rub resistance, many attempts have been made to utilize starch in combination with other materials in order to improve the wet-rib resistance of paper coatings containing a starch-based system as a binder. It would be a distinct advantage to discover a binder, such as a starch-based binder system, which would not possess any of the above disadvantages when used as a portion of a paper coating, and that could be used as a unitary additive without resort to additional materials to make the binder substance workable in a practical manner. Moreover, if a binder system could be discovered which had sufficient storage stability to allow the paper processor time to formulate coatings, and subsequently use the formulated coatings at convenience, such paper coating binders would have extreme utility.

Casein has frequently been used as a binder for high wet-rub resistance coatings. However, casein-based coatings have a number of disadvantages, particularly in their relatively high cost, necessity for importation of the casein ingredient, and susceptibility of the casein to spoilage and putrefication.

It, therefore, becomes an object of the invention to provide improved film-formers that are based on a starch system.

A specific object of the invention is to provide unique starch-based film-formers comprising a special combination of ingredients, which system may be used to treat a number of articles to improve their properties.

Yet another object of the invention is to provide starch-derived film-formers which may be useful in treating cellulosic fibrous substances, like paper and textiles.

A specific object of the invention is to provide paper coatings composed of an improved starch binder system and pigment, which will impart excellent wet-rub resistance to appear members treated therewith.

Other objects will appear hereinafter.

In accordance with the invention an improved film-former has been discovered. In its broadest description the film-former comprises a starch-based system which includes starch, a cationic polymer and a polyaldehyde. The starch system is useful in treating a number of substrates such as cellulosic fibrous materials including textiles and paper articles. It finds particular utility as a binder in combination with inorganic pigments such as clay to provide improved paper coating compositions. These compositions when applied to paper substrates measurably increase water resistance, and particularly wet-rub resistance.

The starch film-formers of this invention are also particularly useful in imparting oil and water resistance to textiles, as well as increasing crease-resistance of the thus treated textile articles. When added to paper pulp at the wet end of the paper-making process, the starch compositions increase wet and dry strength of the resultant dried paper material. While the discussion below will be centered about paper coating compositions and the method of treating paper articles to improve their properties, it is understood that other substrates, as exemplified above, may also be usefully treated with the compositions of the invention.

The basic material that is used in preparing the film-former as defined herein is, of course, starch itself which comprises the major proportion of the film-forming composition. The starch-based system usually includes about 70–98% by weight of starch based on the weight of the entire system including starch, polymer and dialdehyde.

The starting starch material that may be used in practising the invention may be derived from any vegetable source, such as, for example, corn, wheat, potato, tapioca, rice, sago and grain sorghum. Waxy starches may also be used. The term "starch" is used broadly herein and encompasses unmodified starch and tailings, and, as well, starch that has been somewhat modified by treatment with acids, alkalies, enzymes or oxidizing agents. Soluble or partially soluble modified starches, dextrins, pregelatinized products and starch derivatives such as hydroxy ethyl starch, starch propionamide ether, etc. are also suitable here. If the starting starch material is already derivatized in some manner, it is nevertheless useful as long as the product is still amylaceous in nature. Preferred starches have a fluidity failing within the range of 50–90.

The second component useful in forming the compositions of the invention is a cationic polymer preferably a synthetic organic polymer of the addition-type. Polymers of this type preferably have a molecular weight in excess of 600, and may have a molecular weight as high as 100,000 or higher. Typical polymers useful here have a molecular weight of 60,000–100,000. Normally the amount of polymer used in making the film-former as defined here ranges from about 1% to about 10% by weight of cationic polymer based on starch weight.

Typical cationic polymers useful here include polyethylenimine, polyallylamines, such as polydiallylamine, polydimethallylamine, polydiallylmethylamine, polydimethallylethylamine, etc. polyamines derived from ethylenically unsaturated monomeric ester compounds containing a basic amino group such as polydimethylaminoethyl acrylate and methacrylate, poly-3-dimethyl- or 3-diethylaminopropyl acrylate and methacrylate, poly-2-dimethylaminoisopropyl acrylate and methacrylate, polydiethylaminoethyl acrylate, poly-3-dimethyl- or 3-diethylaminopropylethyl acrylate, poly-2-dimethylaminoisopropylethyl acrylate and poly-t-butylaminoethyl methacrylate or acrylate, etc. and other cationic polymers, particularly those containing basic nitrogen groups in the mer units. Salts of any of the foregoing or other cationic polymers have equal utility as film-former ingredients, and in some situations are even preferred. Thus, such acids as acetic, hydrochloric, sulphuric, phosphoric, nitric, etc. may be added to the basic polymer in deriving ingredients useful here. Likewise, cationic monomers may be first put in the salt form, and then subsequently polymerized to produce useful polymeric salts. Polyquaternaries of the foregoing are also useful here.

The most preferred polymer in preparing the starch film-formers described here in terms of producing a final composition particularly useful in coating paper and textile articles is polyethylenimine or any of its corresponding salts.

The third ingredient used in making the herewith described compositions is a polyaldehyde compound. A number of these are readily available such as glyoxal and glutaraldehyde. The former is particularly preferred. Other polyaldehydes such as polyacrolein, dialdehyde starch and starch aldehyde ethers may also be used. Preferred are dialdehydes. Again, in making compositions which form suitable films when applied to cellulosic fibrous substrates, the amount of polyaldehyde present normally ranges from about 1% to about 10% by weight based on the weight of the starch also present.

The starch-based system capable of forming useful films may be made up via any number of alternative routes. For example, aqueous solutions containing the starch, polymer and dialdehyde may be prepared and utilized as needed. These solutions have been found to possess good storage stability even over relatively long periods of time. The particular mode of addition in preparing these solutions is immaterial.

As briefly outlined above, the film-formers described here are particularly useful as binders in coating compositions, particularly those used to coat paper. Coating compositions of this type generally comprise a mixture of water with clay or another inert mineral pigment, and a binder in accordance with this invention. A dispersing agent, such as sodium hexametaphosphate, trisodium polyphosphate, tetrasodium pyrophosphate, or the corresponding potassium salts, is often added. Moreover, an alkaline material, such as sodium hydroxide, ammonium hydroxide or various other alkaline salts or hydroxides of alkali metals, can also be present. The dispersing agent, together with the alkaline material, serves to disperse the pigment. The alkaline material aids in adjusting the pH to the desired value for application, which frequently is about a pH 8. If desired, other additives such as antifoaming agents and preservatives can be added.

It is usually preferred, prior to addition of the starch binder to the pigment, that the starch-based material be first "cooked" in water, that is, heated to a temperature above the gel point of the starch. If the starch is already pasted prior to incorporation with cationic polymer, polyaldehyde and pigment, of course, this step is not necessary.

The pigment portion of the slip may be chosen from a wide variety of inorganic metallic pigments such as clay, talc, titanium dioxide, blanc fixe, powdered tin, precipitated chalk, satin white, ground limestone, etc. Preferred due to ready availability and low cost is clay.

The amounts of the various substituents of the new coating preparations are naturally strongly dependent upon the type and amount of starch derivative, polymer, and aldehyde utilized, the type of inorganic pigment employed, process of application of coating, as well as the properties desired in the finally coated paper. Generally speaking, the coating color contains 20%–70% solids, including 30%–60% of one or more of the above discussed inorganic pigments, based on solids weight, and 1%–25% of the starch-based binder of this invention, based on total solids weight. The above percentage figures are expressed in weight percent. It is understood, of course, that other ingredients may be used along with the starch-based binder materials herein defined, without departing from the scope of the invention.

One excellent method of making up a coating composition involves first dispersing clay or another inorganic pigment in an aqueous solution containing dissolved therein the cationic polymer. Thereafter, starch is added followed by addition of a polyaldehyde such as glyoxal. By following this procedure viscosity of the coating composition is minimized and wet and dry binding strength is maximized.

The actual introduction of the new coating preparation for treating paper or cardboard can be carried out in a variety of ways. Thus, for example, one may use coating members such as an air knife, application roll, a bar wrapped with a wire, a "trailing blade," and a sealing press. After application, the coatings obtained must usually be dried in order to cure the coated paper and bring about the desired property of increased water-resistance. Curing may be effected at room temperature or accelerated by heating the coated paper by various known drying devices.

The mechanism by which the starch-based system is formed into a film such as a coating for paper is not fully understood. It is believed, however, that during the coating operation the polyaldehyde acts as a chemical bridge or link between the cationic polymer and starch, thereby forming a continuous water-resistant film useful for a number of applications.

The following examples illustrate specific preparations of typical starch film-formers of the invention, and their use as binders and paper coatings. These examples are meant to be illustrative, and the invention, of course, is not to be limited thereto. All parts and percentages are by weight unless expressly stated to be otherwise.

EXAMPLE I

An aqueous clay slip (72% solids) was prepared which contained 0.3% tetrasodium pyrophosphate, based on clay weight, and 0.11% caustic.

In a separate preparation polyethylenimine (50–100,000 molecular weight) was added to starch (hydroxyethyl starch) in an amount of 10% by weight based on the weight of the starch present. The polyethylenimine and starch were then cooked and the combination added to the above clay dispersion. Enough of this combination was added to provide about 16 weight percent of starch based on the weight of the clay. To the mixture containing clay, starch and polymer was then added glyoxal in an amount of 10% based on the weight of the starch.

The coating composition was then applied to the felt side of a 50 pound bond paper, the coating dried immediately with forced hot air, and thereafter cured at room temperature for two days. During this cure time, the sheets were conditioned to TAPPI standards, supercalendered, and reconditioned before physical tests were performed.

The two tests to which the coated papers were subjected here were dry binding strength and wet binding strength or wet-rub resistance tests. The dry binding strength was measured by TAPPI Method, T459M-49 wax pick, reported here as a critical wax pick number.

The wet binding strength or wet-rub resistance of the coated paper was measured by modified TAPPI Routine Control RC-184. A 4-inch by 4-inch section of paper was stroked twenty times with a rubber squeegee after a 1-minute soak in water. The coating which had been rubbed off was then transferred into a 100 ml. volumetric flask and diluted to volume. Light transmission through this suspension was read with an electrophotometer in a 50 mm. cell and recorded as percent transmittance. One hundred percent transmittance indicates no ruboff.

In this particular experiment the coating compositions when applied as described above yielded paper having a critical wax pick of 10. The percent transmittance in the wet binding strength test was 91.2%. Both of the above figures indicated excellent dry binding strength and wet-rub resistance via use of the binders of the invention.

EXAMPLE II

Here paper coatings were prepared essentially as described above and the coated article again tested for wet and dry strengths. The method of preparing the coating composition was, however, slightly varied in that the clay was first dispersed in an aqueous solution of polyethylenimine, to which was then added the starch and glyoxal.

The clay coating composition had a total solids of 45%, 16% starch (hydroxyethyl starch) based on clay present, 5% polyethylenimine based on starch weight, and 5% glyoxal based on starch weight.

A paper coating was then prepared and tested as described in Example I. The coated paper had a critical wax pick number of 10 and when subjected to the wet-rub resistance test had a percent transmittance of 88.4%.

It was found that all three ingredients of starch, polymer and polyaldehyde are necessary in order to yield suitable binder compositions. This was borne out in a series of tests. In one test only polyethylenimine and starch were employed as binder ingredients. The subsequently coated paper, made up exactly as just outlined, had essentially no wet-rub resistance, that is, a transmittance reading of 0% was recorded in the wet binding strength test. In another test, starch and glyoxal were the sole binder ingredients. Here the percent transmittance was 40% or less, indicating that the coated paper had less than about half the wet-rub resistance compared to those coated papers formed utilizing the binders described here containing all three essential ingredients.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth.

The invention is hereby claimed as follows:

1. An improved film-former comprising a starch-based system consisting essentially of starch, from about 1% to about 10% based on the weight of starch of an addition-type cationic polymer containing basic nitrogen, and from 1% to about 10% based on the weight of starch of an aliphatic dialdehyde.

2. The film-former of claim 1 wherein the addition-type cationic polymer is polyethylenimine.

3. The film-former of claim 1 wherein said aliphatic dialdehyde is glyoxal.

4. The film-former of claim 2 wherein said dialdehyde is glyoxal.

5. The film-former of claim 2 wherein said polyethylenimine has a molecular weight range of 600-100,000.

6. The film-former of claim 5 wherein said molecular weight range is 60,000-100,000.

7. A paper coating composition comprising an aqueous liquid having suspended therein 20-70 weight percent solids including 30%-60% of an inorganic pigment based on total solids weight and 1%-25% of the film-former of claim 1 based on total solids present, said film-former being useful as a binder in said composition.

8. A paper coating composition comprising an aqueous liquid having suspended therein 20-70 weight percent solids including 30%-60% of an inorganic pigment based on total solids weight and 1%-25% of the film-former of claim 2 based on total solids present, said film-former being useful as a binder in said composition.

9. A paper coating composition comprising an aqueous liquid having suspended therein 20-70 weight percent solids including 30%-60% of an inorganic pigment based on total solids weight and 1%-25% of the film-former of claim 4 based on total solids present, said film-former being useful as a binder in said composition.

10. The paper coating composition of claim 7 wherein said inorganic pigment is clay.

11. The paper coating composition of claim 8 wherein said inorganic pigment is clay.

References Cited

UNITED STATES PATENTS 2,698,793   1/1955   Landes et al. _____ 260—2

OTHER REFERENCES

Abstract Bull. Inst. Paper Chem., vol. 36, No. 1, Thayer #418, No. 3, Fikentscher #1998, Machida et al. #5617, Nobel-Bozel #5250.

ABIPC, vol. 37, No. 6, Trade Review #4231, No. 8, Codolini #5854.

ABIPC, vol. 38, No. 1, Nobel-Bozel S.A. #391, and Wilson #398.

ABIPC, Rumberger #9117 (U.S. Patent 3,293,057).

WILLIAM SHORT, Primary Examiner

E. WOODBERRY, Assistant Examiner

U.S. Cl. X.R.

117—138.5, 155, 165; 162—167; 260—9, 17.4, 39